United States Patent

[11] 3,581,950

| [72] | Inventor | Kenneth W. Miller<br>P.O. Box 206, Littlestown, Pa. 17340 |
|---|---|---|
| [21] | Appl. No. | 832,888 |
| [22] | Filed | June 13, 1969 |
| [45] | Patented | June 1, 1971 |

[54] VARIABLE SPEED DRIVE MECHANISM FOR SEED PLANTERS
5 Claims, 4 Drawing Figs.

| [52] | U.S. Cl. | 222/177 |
|---|---|---|
| [51] | Int. Cl. | B67d 5/64 |
| [50] | Field of Search | 222/177; 239/156 |

[56] References Cited
UNITED STATES PATENTS

| 2,906,539 | 9/1959 | Ritter | 222/177X |
|---|---|---|---|
| 3,063,599 | 11/1962 | Kestel | 222/177 |
| 3,202,323 | 8/1965 | Powell | 222/177 |

*Primary Examiner*—Lloyd L. King
*Attorney*—Birch, Swindler, McKie & Beckett

ABSTRACT: The invention is a variable speed drive mechanism for a seed planter of the type having a rotatably driven seed dispenser, a ground-engaging wheel and a power transmission means drivingly connecting the wheel to the dispenser for driving the dispenser. The mechanism includes a plurality of selectively engageable drive trains connected to the transmission means and interposed between the wheel and the dispenser. The drive trains are operable to drive the dispenser at different velocities with respect to the rotational velocity of the wheel.

INVENTOR
KENNETH W. MILLER

BY
*Irons, Birch, Swindler & McKee*
ATTORNEYS

INVENTOR
KENNETH W. MILLER 3,581,950

VARIABLE SPEED DRIVE MECHANISM FOR SEED PLANTERS

BACKGROUND OF THE INVENTION

1. Field of the Invention

This invention relates to mechanisms for driving the seed dispensers of seed planters, and specifically to a mechanism for driving such dispensers at variable velocities.

2. Description of the Prior Art

Variations in soil fertility within a particular field have long presented a problem with respect to seed planting. Generally, the greater the fertility of the soil, the greater is its ability to support plant life. Therefore, desirably, fewer seeds should be planted per unit area in the less fertile areas of a field than in the more fertile areas.

Conventional seed planters, such as corn planters, however, include no means for rapidly changing the number of seeds planted by the planter per unit, i.e. the seed population. For example, the only means employed on most conventional corn planters for changing the seed population are a plurality of individually operable chain and sprocket assembles. Such assembles usually comprise a plurality of pairs of aligned sprockets having different diameters and a chain which must be manually connected about the appropriate sprocket pair for obtaining the desired seed population. As is apparent, in order to change the seed population, an operator must manually disconnect the chain from about one sprocket pair and manually reconnect the chain about another sprocket pair, an inconvenient and time-consuming procedure. As a practical matter, in a field which encompasses several variations in soil fertility, such as in mountainous or hill terrain, it is infeasible to change the seed population during a planting operation.

SUMMARY OF THE INVENTION

The variable speed drive mechanism of the present invention is particularly adapted to rapidly and effectively change the seed population during a planting operation, and thus obviates the foregoing problem.

The mechanism of the invention is adapted to be used on a seed planter, such as a corn planter, of the type having a frame, at least one rotatably driven seed dispenser mounted on the frame, at least one ground-engaging wheel rotatably mounted on the frame, and a power transmission means drivingly connecting the wheel to the dispenser for driving the dispenser, and basically comprises; support means affixable to the frame; a first shaft journaled for rotation in the support means and being drivably connectable to the wheel by a first portion of the transmission means so that the first shaft may be rotated at a proportionally fixed rotational velocity with respect to the rotational velocity of the wheel; a second shaft journaled in the support means and being drivingly connectable to the dispenser by a second portion of the transmission means so that the dispenser may be driven at a proportionally fixed velocity with respect to the rotational velocity of the second shaft; a plurality of selectively engageable drive trains drivingly connecting the first shaft to the second shaft and being operable to rotate the second shaft at different rotational velocities with respect to the rotational velocity of the first shaft; and means for individually selectively engaging said drive trains from a remote location, whereby the dispenser may be driven at different velocities with respect to the rotational velocity of the wheel.

Preferably, each of the drive trains includes a selectively engageable power-operated clutch mounted on the first shaft and a rotary drive means connecting the clutch to the second shaft. Conveniently, the clutches are operated by electric or hydraulic power means. The rotary drive means preferably comprises first and second sprockets connected to the clutch and the second shaft, respectively, and a chain trained about the sprockets. In order to permit the second shaft to be rotated at different rotational velocities with respect to the rotational velocity of the first shaft, one of the first or second sprockets of all of the drive trains are of substantially equal diameter and the other sprockets of all of the drive trains are of different diameters.

With the foregoing in mind, it is an object of the present invention to provide an improved variable speed drive mechanism for a seed planter.

It is also an object of the invention to provide a variable speed drive mechanism for a seed planter, which mechanism rapidly and effectively changes the number of seeds planted by the planter per unit area during a planting operation.

It is a further object of the invention to provide a variable speed drive mechanism for a seed planter of the type having a seed dispenser drivably connected to a ground-engaging wheel, which mechanism rapidly and effectively varies the velocity of the dispenser independently of the rotational velocity of the wheel.

It is an additional object of the invention to provide a variable speed drive mechanism for seed planters, which mechanism embodies a rugged structure and is relatively easy to operate and maintain.

These and other objects of the invention will become apparent upon a consideration of the detailed description of the preferred embodiments thereof given in connection with the following drawings.

DESCRIPTION OF THE PREFERRED EMBODIMENTS

Figure 1:
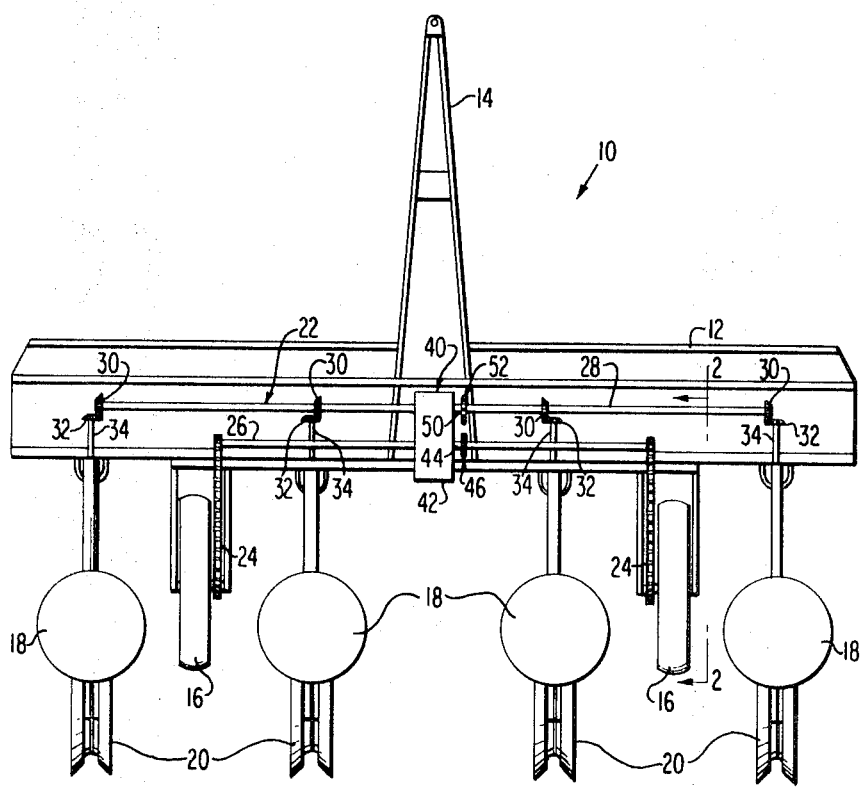
FIG. 1 is a schematic plan view of a conventional corn planter having the variable speed drive mechanism of the invention installed thereon.
Figure 2:
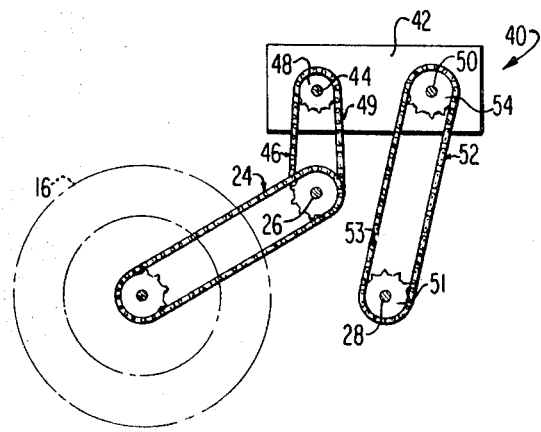
FIG. 2 is a sectional view taken along line 2–2 of FIG. 1.

A schematic plan view of a conventional corn planter is shown in FIG. 1, as designated by reference numeral 10. Planter 10 includes a frame 12 to which is attached a towbar 14. The towbar is adapted to be connected to the hitch of a tractor used for pulling planter 10. A pair of ground-engaging wheels 16 are rotatably mounted on frame 12 for supporting the planter. Also mounted on frame 12 are a plurality of seed dispensers 18. Dispensers 18 are of conventional construction, each including a rotatable seed plate, associated valves and a storage hopper. The seed population planted by planter 10 is dependent upon the velocity at which dispensers 18 are driven. A press wheel 20 is rotatably mounted on frame 12 behind each dispenser 18.

Wheels 16 are drivingly connected to dispensers 18 by a power transmission means 22. Transmission means 22 includes a chain and sprocket drive assembly 24 connected between the hub of each wheel 16 and a drive shaft 26 journaled in frame 12. The transmission means also includes a countershaft 28 having a plurality of bevel gears 30 affixed thereto. Each gear 30 drivingly engages a bevel gear 32 which is affixed to a dispenser drive shaft 34. Each shaft 34 is drivingly connected to one of dispensers 18 for rotatably driving the dispenser.

In conventional corn planters, drive shaft 26 is drivingly connected to countershaft 28 by a conventional chain and sprocket drive. Generally, a plurality of aligned pairs of sprockets having different diameters are affixed to the shafts and a chain is connected about one of the sprocket pairs. When the chain is connected about a particular sprocket pair, dispensers 18 are driven at a proportionally fixed velocity with respect to the rotational velocity of wheels 16. Should an operator desire to change the proportional velocity of dispensers 18 with respect to the rotational velocity of wheels 16, to thus change the seed population, he must manually disconnect the chain from about one sprocket pair and manually reconnect it about another sprocket pair. Obviously, such procedure is inconvenient and time consuming. Generally, the disadvantages of this procedure eliminate the practical feasibility of changing the seed population during the planting of a single field.

The mechanism of the invention obviates this problem and is adapted to be installed on corn planter 10 for rapidly and effectively changing the seed population during a planting operation. Although the mechanism is shown installed on a corn planter, it is equally well adapted to be installed on seed planters other than corn planters, in which it is desirable to change the seed population during a planting operation.

The mechanism of the invention is designated generally by reference numeral 40, and is adapted to be connected to transmission means 22 and interposed between wheels 16 and dispensers 18. Mechanism 40 includes a support means affixable to frame 12. Conveniently the support means comprised a case 42. Journaled in case 42 is first shaft 44. Shaft 44 is drivably connected to wheels 16 by a first portion of transmission means 22. Specifically, shaft 44 is drivably connected to wheels 16 by chain and sprocket drive assemblies 24, drive shaft 26 and a chain and sprocket drive assembly 46. Assembly 46 includes a sprocket (not shown) affixed to shaft 26, a sprocket 48 affixed to an end of shaft 44 extending externally of case 42, and a chain 49 trained about the sprockets. As will be apparent, shaft 44 will be driven at a proportionally fixed rotational velocity with respect to the rotational velocity of wheels 16.

Also journaled in case 42 is a second shaft 50. Shaft 50 is drivably connected to dispensers 18 by a second portion of transmission means 22. Specifically, shaft 50 is drivingly connected to dispensers 18 by a chain and sprocket drive assembly 52, countershaft 28, gears, 30, gears 32 and dispenser drive shafts 34. Assembly 52 includes a sprocket 54 affixed to an end of shaft 50 extending externally of case 42, a sprocket 51 affixed to shaft 28, and a chain 53 trained about the sprockets. As will be apparent, dispensers 18 will be driven at a proportionally fixed velocity with respect to the rotational velocity of shaft 50.

Figure 3:
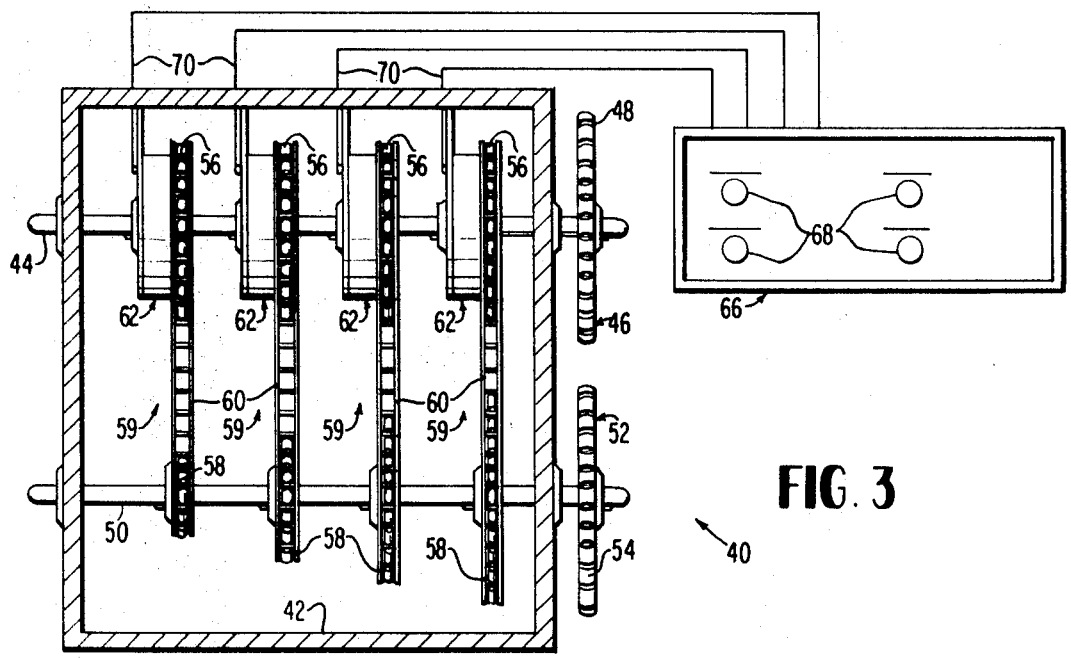
FIG. 3 is a sectional view of a first embodiment of the mechanism of the invention.
Figure 4:
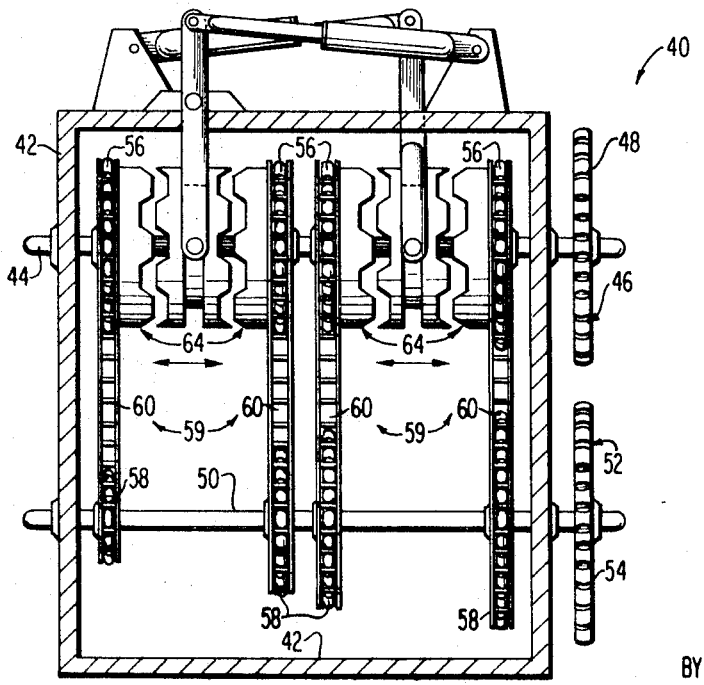
FIG. 4 is a sectional view of a second embodiment of the mechanism of the invention.

A plurality of selectively engageable drive trains 59 drivingly connect shaft 44 to shaft 50 and are operable to rotate the latter at different rotational velocities with respect to the rotational velocity of the former. Each drive train 59 includes a selectively engageable power-operated clutch mounted on shaft 44. In the embodiment of the invention shown in FIG. 3 the clutches comprise electrically powered magnetic clutches 62, and in the embodiment of the invention shown in FIG. 4 the clutches comprise hydraulically powered mechanical clutches 64. Clutches 62 and 64 are of conventional construction.

Each drive train 59 also includes a rotary drive means connecting the associated clutch 62 or 64 to shaft 50. Each rotary drive means conveniently comprises a first sprocket 56 connected to the associated clutch, a second sprocket 58 affixed to shaft 50 and radially aligned with the associated sprocket 56, and a chain 60 trained about sprockets 56 and 58. As is apparent, the rotational velocity of shaft 50 with respect to the rotational velocity of shaft 44 is dependent upon the ratio of the diameters of sprockets 56 and 58 of the particular drive train 59 which is engaged for driving shaft 50. In order to permit shaft 50 to be rotated at different rotational velocities with respect to the rotational velocity of shaft 44, the sprocket diameter ratio for each drive train 59 is different. For this purpose, all of sprockets 56 are of substantially equal diameter and all of sprockets 58 are of different diameters.

Means are provided for individually selectively engaging clutches 62 or 64, from a remote location. Such means conveniently comprises a control panel assembly 66 including a plurality of pushbutton switches 68. Although a control panel assembly 68 is shown in the drawings only in connection with the embodiment shown in FIG. 3, a similar assembly also is used in connection with the embodiment shown in fig. 4 for controlling the engagement of clutches 64. Assembly 66 is adapted to be mounted in a position remote from mechanism 40, such as on the tractor used for pulling planter 10. Switches 68 are operably connected to the actuators of clutches 62 and 64 by electrical leads 70. With respect to clutches 62, leads 70 are connected to conventional coils surrounding the clutch rotors, and with respect to clutches 64, leads 70 are connected to conventional hydraulic valve actuating solenoids. Switches 68 are individually operable for engaging the selected clutch 62 or 64 to provide the desired rotational velocity of shaft 50 with respect to the rotational velocity of shaft 44. Thus, shaft 50 may be driven at different rotational velocities with respect to the rotational velocity of shaft 44, while the latter is driven at a proportionally fixed rotational velocity with respect to the rotational velocity of wheels 16. Consequently, dispensers 18 may be driven at different velocities with respect to the rotational velocity of wheels 16 to change the seed population planted by planter 10.

Mechanism 40 thus provides a means for rapidly and effectively changing the seed population during a planting operation, and thus is ideally suited for installation on seed planters used for planting fields having varying soil fertilities. In particular, mechanism 40 obviates the inconvenient and time-consuming procedure required for changing the seed population on conventional seed planters. Moreover, mechanism 40 embodies a rugged structure which is easy to operate and maintain. In addition, mechanism 40 may be installed on conventional seed planters without undue difficulty; being interposed in the power transmission means employed for driving the seed dispenser of such planters.

The foregoing constitutes a detailed description of the preferred embodiments of the invention. However, it is recognized that various modifications thereof may occur to those skilled in the art. For example, it is immaterial whether all of sprockets 56 or all of sprockets 58 are of substantially equal diameter. In the embodiments shown in the drawings all of sprockets 56 are of equal diameter, while sprockets 58 are of different diameters. However, the reverse of this relationship is clearly embodied by the invention. Also, drive trains 59 have been shown to comprise chain and sprocket rotary drive means. However, gear or belt and pulley rotary drive means clearly are the equivalent of the chain and sprocket rotary drive means described. Also, power-oriented clutches of various types other than clutches 62 and 64 could be employed in mechanism 40 with equal facility.

I claim:

1. A variable speed drive mechanism for a seed planter of the type having a frame, at least one rotatably driven seed dispenser mounted on said frame, at least one ground-engaging wheel rotatably mounted on said frame, and a power transmission means drivingly connecting said wheel to said dispenser for driving the dispenser, said mechanism comprising:

support means affixable to said frame;

a first shaft journaled for rotation in said support means, said first shaft being drivably connectable to said wheel by a first portion of said transmission means so that the first shaft may be rotated at a proportionally fixed rotational velocity with respect to the rotational velocity of the wheel;

a second shaft journaled in said support means, said second shaft being drivingly connectable to said dispenser by a second portion of said transmission means so that the dispenser may be driven at a proportionally fixed velocity with respect to the rotational velocity of the second shaft;

a plurality of selectively engageable drive trains drivingly connecting said first shaft to said second shaft, each of said drive trains consisting of a selectively engageable power-operated clutch mounted on said first shaft, a first rotary drive element connected to said clutch, and a second rotary drive element affixed to said second shaft, said first element being radially aligned with and drivingly connected to said second element; and means for individually selectively engaging said clutches from a remote location, whereby said second shaft is rotated at different rotational velocities with respect to the rotational velocity of said first shaft upon individual selective engagement of said clutches.

2. A mechanism as recited in claim 1, wherein said first rotary drive element comprises a first sprocket and said second rotary drive element comprises a second sprocket; and wherein said first sprocket is drivingly connected to said second sprocket by a chain trained about said first and second sprockets.

3. A mechanism as recited in claim 2, wherein the first sprockets of all of said drive trains are of substantially equal diameter and the second sprockets of all of said drive trains are of different diameters.

4. A mechanism as recited in claim 1, wherein said clutches are operated by electric power means.

5. A mechanism as recited in claim 1, wherein said clutches are operated by hydraulic power means.